United States Patent [19]
Mohan et al.

[11] Patent Number: 5,656,924
[45] Date of Patent: Aug. 12, 1997

[54] SYSTEM AND METHOD FOR PROVIDING HARMONIC CURRENTS TO A HARMONIC GENERATING LOAD CONNECTED TO A POWER SYSTEM

[75] Inventors: Ned Mohan, St. Paul; Girish Kamath, Minneapolis; Vernon D. Albertson, Roseville, all of Minn.

[73] Assignee: Schott Power Systems Inc., Wayzata, Minn.

[21] Appl. No.: 534,493

[22] Filed: Sep. 27, 1995

[51] Int. Cl.$^6$ ................................................ H02M 1/12
[52] U.S. Cl. ................................................ 323/210
[58] Field of Search .................. 307/105; 363/39–44, 363/84, 87–89, 95–98, 129–132, 137

[56] References Cited

U.S. PATENT DOCUMENTS

| | | | |
|---|---|---|---|
| 4,053,820 | 10/1977 | Peterson et al. | 363/44 |
| 4,224,660 | 9/1980 | Mohan | 363/48 |
| 5,345,375 | 9/1994 | Mohan | 363/40 |
| 5,499,178 | 3/1996 | Mohan | 363/39 |

OTHER PUBLICATIONS

Conor A. Quinn, Ned Mohan and Harshad Mehta, "A Four–Wire, Current–Controlled Converter Provides Harmonic Neutralization in Three–Phase, Four–Wire Systems", *IEEE/APEC*, 1993, pp. 841–846.

Prem P. Khera, "Application of Zigzag Transformers for Reducing Harmonics in the Neutral Conductor of Low Voltage Distribution System", *IEEE/IAS*, 1992, p. 1.

P. Enjeti, W. Shireen, P. Packebush and I. Pitel, "Analysis and Design of a New Active Power Filter to Cancel Neutral Current Harmonics in Three Phase Four Wire Electric Distrtibution Systems", *IEEE/IAS Conference Records*, 1993, pp. 939–946.

*Primary Examiner*—Aditya Krishnan
*Attorney, Agent, or Firm*—Nawrocki, Rooney & Sivertson, P.A.

[57] ABSTRACT

A system and method for providing harmonic currents to a harmonic generating load connected to a multiphase alternating current power system includes a zig-zag transformer and a current generator. The zig-zag transformer is electrically connected to the multiphase alternating current power system. The current generator is electrically connected between a neutral of the zig-zag transformer and a neutral return path of the multiphase alternating current power system. The current generator injects a harmonic current into the neutral of the zig-zag transformer which in turn, reduces the harmonic currents provided to the load from the multiphase alternating current power system.

15 Claims, 4 Drawing Sheets

SYSTEM AND METHOD FOR PROVIDING HARMONIC CURRENTS TO A HARMONIC GENERATING LOAD CONNECTED TO A POWER SYSTEM

BACKGROUND OF THE INVENTION

The present invention relates to a system for reducing harmonic currents on a multiphase alternating current power system due to the use of harmonic current generating loads connected to the power system. More particularly, the present invention relates to active filters used to selectively inject harmonic currents into the multiphase alternating current power system.

The use of non-linear loads such as uninterruptable power supplies (UPS), adjustable speed drives, induction heaters, arc welders and computer equipment, to name a few, has been steadily increasing. These devices are connected to the power system at a point of common coupling (PCC) and can be supplied electric power from a three-phase, four-wire distribution system with both single-phase and three-phase inputs.

Typically, a non-linear load includes a converter that is used to convert the alternating current power from the utility system to direct current power. As is commonly known, converters contribute harmonic current into the power system. These harmonic currents can interfere with communication and control signals, cause economic losses due to errors in metering and malfunctioning of utility system protection relays and stress the utility system equipment, for example, the distribution transformers, from heat generated by the harmonic currents and over-voltage conditions that can occur in resonant situations.

National and international agencies have established various standards and guidelines to specify allowable limits for harmonic currents on a system. Recently, IEEE 519-1992 was revised to recommend a limit on the total harmonic distortion (THD) in the current at the point of common coupling to be as low as 5%.

Active filters have been used in the past to control the presence of harmonic currents in the power system. Typically, the active filter includes a power electronic converter that supplies the harmonic currents present at the point of common coupling so the harmonic currents are not present on other portions of the power system. Active filters for eliminating harmonic currents in a three-phase, four-wire system have been reported in "A Four-Wire, Current-Controlled Converter Provides Harmonic Neutralization in Three-Phase, Four-Wire systems", 1993 IEEE/APEC PROCEEDINGS, pp. 841–846. Another active filter disclosed in "Analysis and Design of a New Active Power Filter to Cancel Neutral Current Harmonics in Three Phase Four Wire Electric Distribution Systems", 1993 IEEE/IAS Conference Records, pp. 939–946, only reduces the neutral-wire current harmonics.

As an alternative to using an active filter, the use of a zig-zag transformer for injecting currents in a power system is described in "Application of Zig-Zag Transformers for Reducing Harmonics in the Neutral Conductor of Low Voltage Distribution System" 1990 IEEE/IAS Conference Records. This reference discloses the use of a zig-zag transformer to reduce harmonics in the neutral path of a low voltage distribution system. Phase windings of the zig-zag transformer are connected to each of the phase conductors of the power system. The neutral of the zig-zag transformer is connected to the neutral conductor of the power system. The zig-zag transformer shares neutral current with a secondary winding of the distribution transformer in proportion to the impedance of the alternate current paths.

SUMMARY OF THE INVENTION

A system and method for providing harmonic currents to a harmonic generating load connected to a multiphase alternating current power system includes a zig-zag transformer and a current generator. The zig-zag transformer is electrically connected to the multiphase alternating current power system. The current generator is electrically connected between a neutral of the zig-zag transformer and a neutral return path of the multiphase alternating current power system. The current generator injects a harmonic current into the neutral of the zig-zag transformer which in turn, reduces the harmonic currents provided to the load from the multiphase alternating current power system.

In a preferred embodiment of the present invention, the current generator injects current into the neutral zig-zag transformer as a function of harmonic current in the neutral return path from the load. In addition, a second current generator is electrically connected to the multiphase current power system and supplies another harmonic current to the multiphase current power system different than the harmonic current in the neutral return path. In a further preferred embodiment, the zig-zag transformer includes a set of delta connected windings. The second current generator is connected to the set of delta connected windings.

The present invention provides an active filter for a multiphase alternating current power system having a neutral return path. Injection of harmonic currents into the neutral of a zig-zag transformer reduces the kVA rating of an inverter used to generate the injected harmonic current. A reduced kVA rating is achieved because the neutral of the zig-zag transformer and the neutral return path are substantially the same. Further reduction in the kVA rating of the preferred embodiments is achieved by separation of the neutral harmonic current components from the non-neutral harmonic current components wherein harmonic components present on the neutral return path are injected into the neutral of the zig-zag transformer and all other harmonic components of the harmonic currents are generated and injected by the second current generator.

DETAILED DESCRIPTION OF THE PREFERRED EMBODIMENTS

Figure 1:
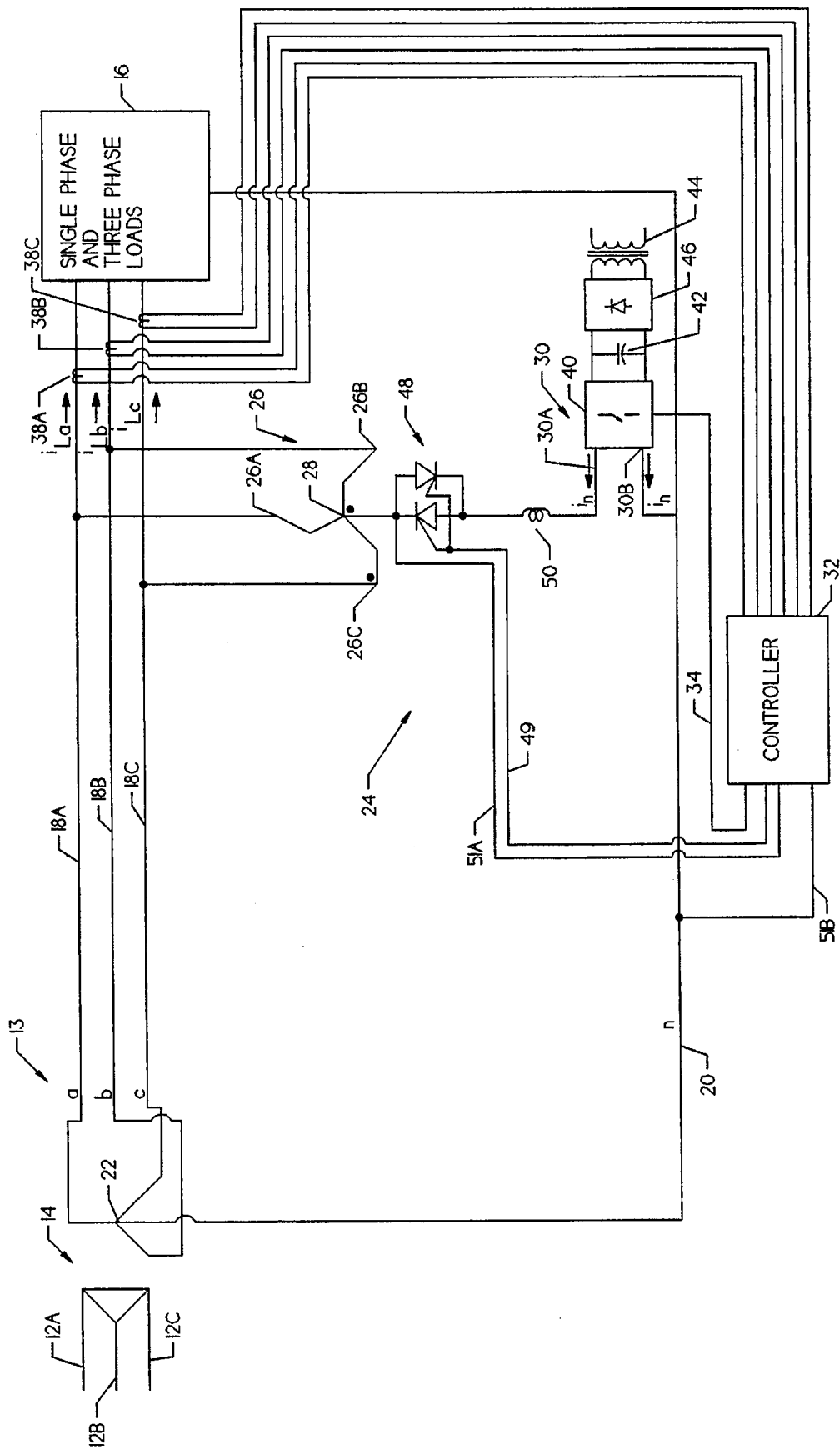
FIG. 1 is a schematic illustration of a power system including a first embodiment of an active filter of the present invention.

FIG. 1 illustrates a simplified three-phase alternating current power system indicated at lines 12A, 12B and 12C connected to a distribution power system 13 having a distribution transformer 14. The distribution transformer 14 supplies power to single phase and three phase loads indicated at 16 along conductors 18A, 18B and 18C. As illustrated, the distribution power system 13 includes a neutral return path 20 connecting the single phase and three phase loads 16 with a neutral 22 of the distribution transformer 14. The single phase and three phase loads represented at 16 include electrical devices such as uninterruptable power supplies (UPS), adjustable speed drives, induction heaters, arc welders, computer equipment and other similar devices that draw harmonic currents (currents having frequencies that are odd, integer multiples of the base fundamental frequency). As discussed in the background section of this application, the harmonic currents interfere with operation of the overall power system.

An embodiment of an active filter of the present invention is indicated generally at 24. The active filter 24 reduces the harmonic currents in the power system, for example in conductors 12A–12C or in the conductors 18A–18C between the distribution transformer 14 and the active filter 24, which would otherwise be drawn from the power system if the active filter 24 was not present.

It should be understood that the active filter 24 and the other active filters described below do not compensate for the displacement power factor due to the reactive component of the fundamental frequency phase currents. Also, no attempt is made to balance the fundamental frequency phase currents. Suitable circuitry and control schemes can be implemented to compensate for displacement power factor and fundamental frequency phase currents, if desired.

In the embodiment illustrated in FIG. 1, the active filter 24 includes a zig-zag transformer 26 having output terminals 26A, 26B and 26C electrically connected to the conductors 18A–18C. As is conventionally known, the zig-zag transformer 26 includes a neutral 28. In the prior art teachings of Khera as described in "Application of Zig-Zag Transformers for Reducing Harmonics in the Neutral Conductor of Low Voltage Distribution System" 1990 IEEE/IAS Conference Records, Khera discloses that the neutral of a zig-zag transformer can be electrically connected to the neutral path of the distribution system. The neutral of the zig-zag transformer in Khera shares the neutral current with the neutral of the distribution transformer based on the impedance of the alternate current paths.

In the present invention, the active filter 24 includes a current generator 30 having output terminals 30A and 30B electrically connected between the neutral 28 of the zig-zag transformer 26 and the neutral conductor 20. The current generator 30 generates a current $i_n$ that is injected into the neutral 28 of the zig-zag transformer 26. The neutral current $i_n$ divides equally between the individual phases of the zig-zag transformer 26 to flow into each of the conductors 18A, 18B and 18C.

In FIG. 1, $i_{La}$, $i_{Lb}$ and $i_{Lc}$ are the load phase harmonic currents drawn by the single phase and three phase loads 16. Current transformers 38A, 38B and 38C provide suitable signals to a controller 32 indicative of the load phase harmonic currents $i_{La}$, $i_{Lb}$ and $i_{Lc}$, respectively. From the load phase harmonic currents $i_{La}$, $i_{Lb}$ and $i_{Lc}$, the controller 32 can calculate the required neutral current $i_n$ according to the following equation:

$$i_n = i_{La} + i_{Lb} + i_{Lc} \tag{1}$$

In the embodiment illustrated, the current generator 30 includes a rectifier 46 that rectifies alternating current power from a single phase transformer 44. A capacitor 42 maintains suitable DC voltage for a single phase inverter 40. Inductor 50 reduces ripple in the current generated by the current generator 30 since practical current generators are non-ideal.

Anti-parallel thyristors 48 protect against voltage unbalance in the distribution system 13. Normally, the controller 32 provides a suitable signal via signal line 49 to turn on the thyristors 48 when the voltage between the neutral 28 and the neutral conductor 20 (as provided via signal lines 51A and 51B, respectively) is below a selected value. However, when this voltage exceeds the selected value, the controller 32 will turn the thyristors 48 off to isolate the current generator 32 from the zig-zag transformer 26.

The active filter 24 of FIG. 1 reduces the harmonic currents present in the neutral conductor 20 between a node 21 and the node 22 of the distribution transformer 14 to substantially zero since the current generator 30 is operated pursuant to Equation 1 above. Reduction of the harmonics present in the neutral conductor 20 reduces the harmonics present in each of the conductors 18A–18C; however, in most cases, reduction of the harmonics in the conductors 18A–18C to zero is not achieved.

Figure 2:
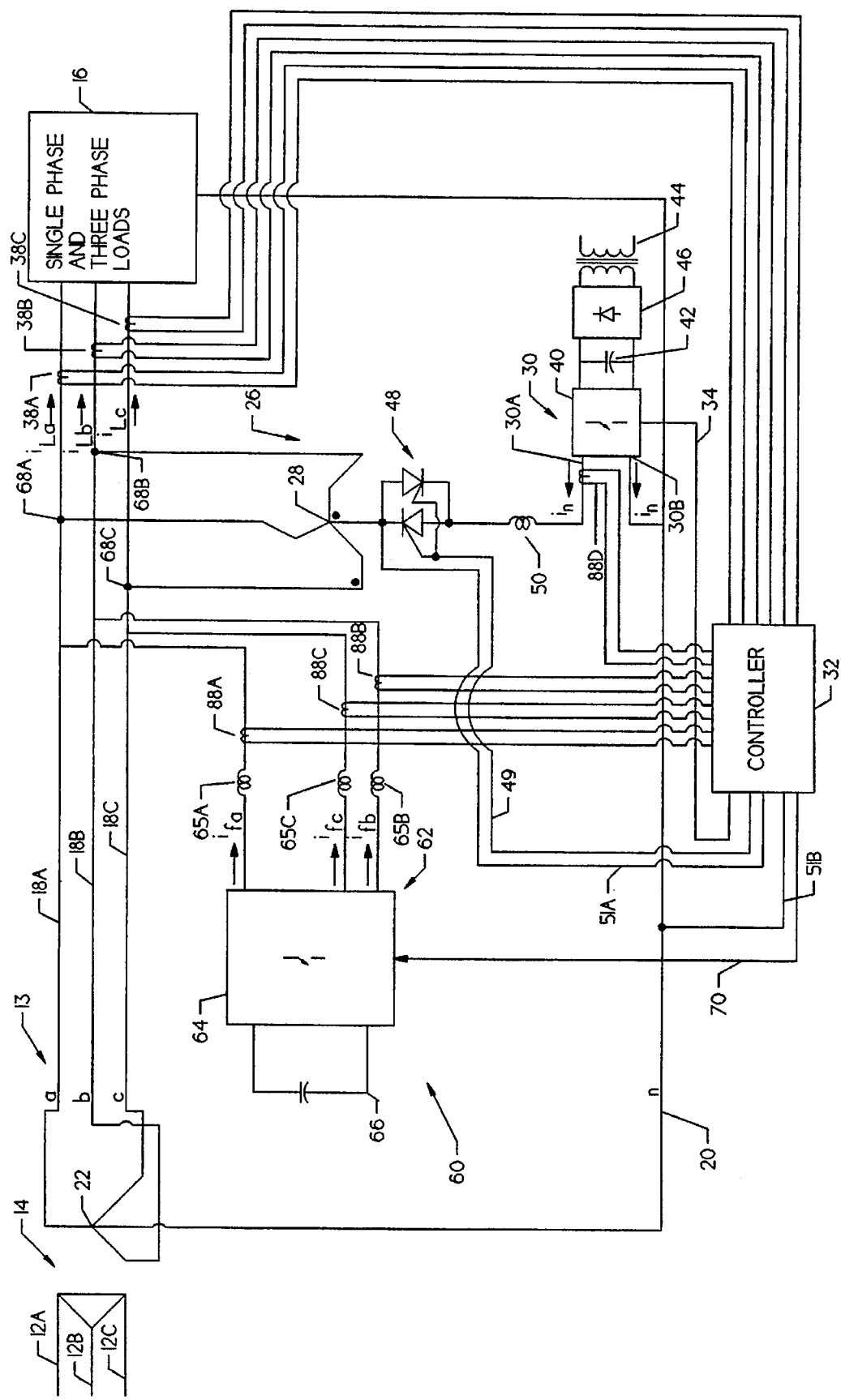
FIG. 2 is a schematic illustration of the power system including a second embodiment of an active filter of the present invention.

FIG. 2 illustrates an active filter 60 to further reduce the harmonic currents in the conductors 18A–18C. The active filter 60 includes the zig-zag transformer 26, and the current generator 30 and associated circuitry as described above to generate a current substantially equal to the harmonic current present in the neutral conductor 20 from the single phase and three phase loads 16. In addition, the active filter 60 includes a second current generator indicated at 62. In this embodiment, the second current generator 62 includes a three-phase inverter 64 connected to a capacitor 66 maintained at a suitable DC voltage. Inductors 65A, 65B and 65C are provided to reduce ripple. As illustrated, the three-phase inverter 64 provides corresponding phase currents $i_{fa}$, $i_{fb}$, $i_{fc}$ to each of the corresponding conductors 18A–18C. Using Kirchhoff's current law at nodes 68A, 68B and 68C, the phase currents $i_{fa}$, $i_{fb}$, $i_{fc}$ can be expressed as:

$$i_{fa} = i_{La} - i_n/3 \tag{2A}$$

$$i_{fb} = i_{Lb} - i_n/3 \tag{2B}$$

$$i_{fc} = i_{Lc} - i_n/3 \tag{2C}$$

The three-phase inverter 64 of the current generator 62 receives suitable control signals from the controller 32 along a signal line 70 to satisfy Equations 2A–2C.

Figure 3:
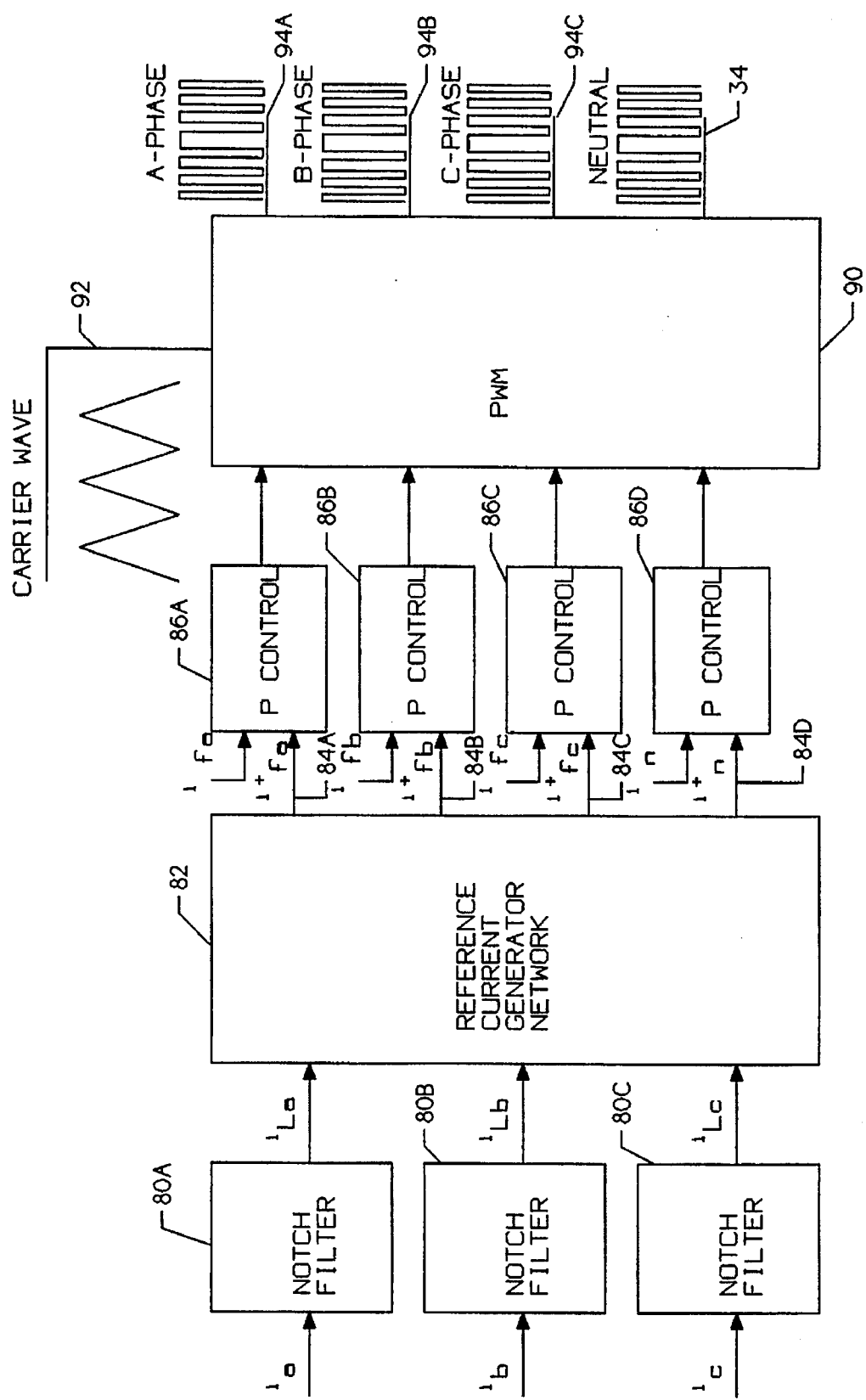
FIG. 3 is a block diagram of a controller for the active filter of FIG. 2.

FIG. 3 illustrates one example of a control scheme embodied in the controller 32 suitable for controlling the inverters 40 and 64. As illustrated, representative signals $i_a$, $i_b$, $i_c$ of each of the currents flowing in the conductors 18A–18C, as measured by the current transformers 38A–38C, respectively, are applied to corresponding notch filters 80A, 80B and 80C, respectively. The notch filters 80A–80C are tuned to the fundamental frequency of the power system, typically 50 Hz or 60 Hz, so as to isolate the harmonic currents flowing in each of the phases from the fundamental base frequency current. A reference current generator network 82 receives a signal from each of the notch filters 80A–80C indicative of the harmonic currents flowing in the phase conductors 18A–18C. The reference current generator network 82 generates reference currents $i^*_{fa}$, $i^*_{fb}$, $i^*_{fc}$ and $i^*_n$ at signal lines 84A, 84B, 84C and 84D, respectively. Suitable control devices such as proportional controllers indicated at 86A, 86B, 86C and 86D compare each of the generated reference currents $i^*_{fa}$, $i^*_{fb}$, $i^*_{fc}$ and $i^*_n$ with corresponding measured currents $i_{fa}$, $i_{fb}$, $i_{fc}$ and $i_n$ as measured from current transformers 88A, 88B, 88C and 88D (FIG. 2). In this embodiment, output control signals from the proportional controllers 86A–86D are provided to a pulse width modulator circuit 90 operating according to Current Asynchronous Sine Pulse Width Modulation (ASPWM) operating at a suitable switching frequency such as 8 kHz provided by a reference carrier signal from signal line 92. The pulse width modulator 90 generates inverter control signals 94A, 94B and 94C (which together comprise the signal along signal line 70) to control operation of the three-phase inverter 64. The control signal for the inverter 40 is also generated and provided by the signal line 34.

Of course, the control circuit embodied in FIG. 3 can be simplified with the elimination of the proportional controllers 86A–86C to control operation of the circuit illustrated in FIG. 1. The reference current generator in network 82 would provide only the reference current $i^*_n$ on signal line 84D with corresponding control signals for the inverter 40 provided by the pulse width modulator 90 on the signal line 34.

In the embodiment illustrated in FIG. 2, it is assumed that the three-phase inverter 64 operates at line-to-line voltages in accordance with the line-to-line voltages between the conductors 18A–18C. If necessary, a suitable transformer such as a wye—wye transformer can be interposed between the three-phase inverter 64 and the conductors 18A–18C to step-up or step-down the operating voltage of the three-phase inverter 64 to that of the conductors 18A–18C.

Figure 4:
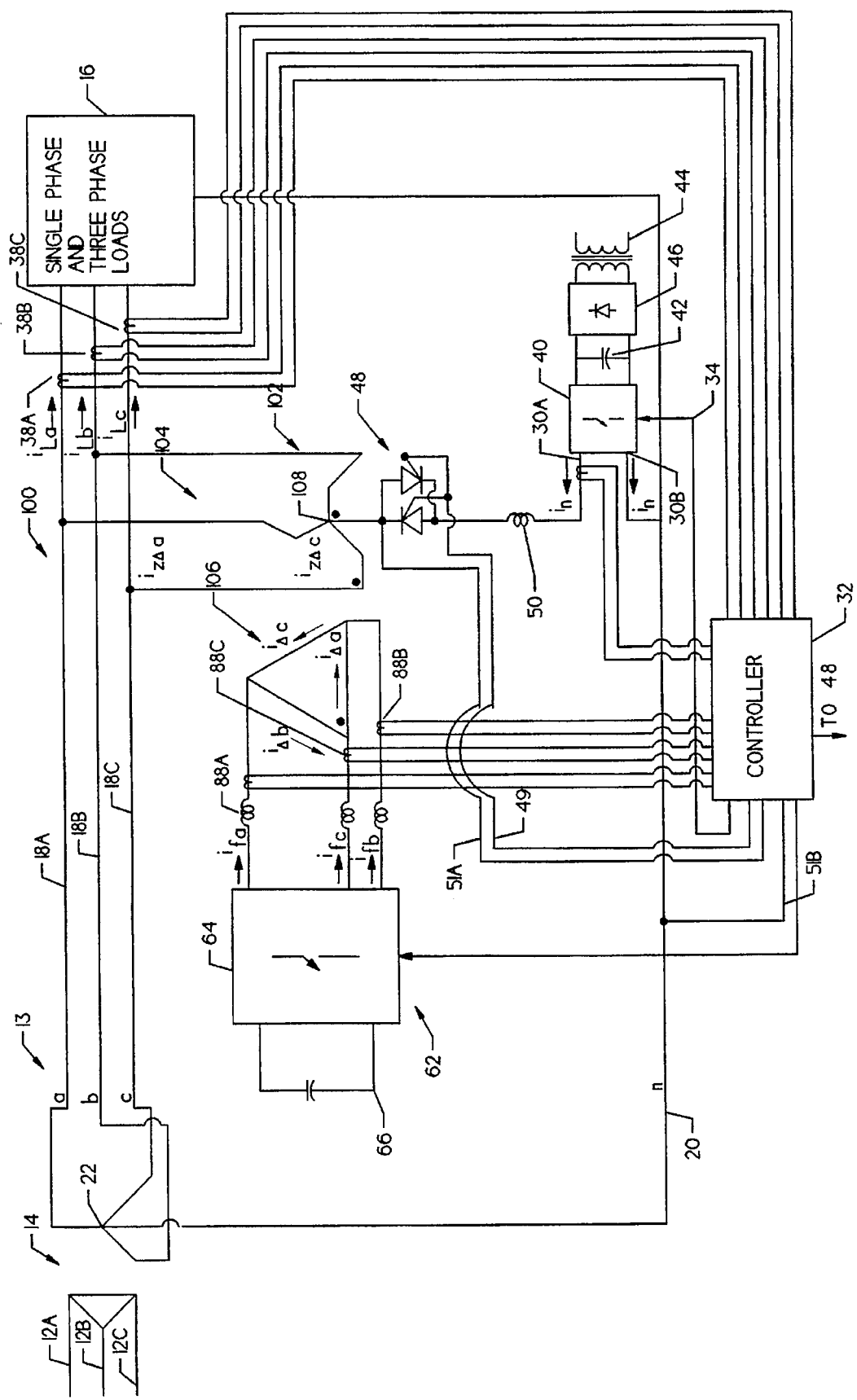
FIG. 4 is a schematic illustration of the power system including a third embodiment of an active filter of the present invention.

FIG. 4 illustrates another active filter 100 of the present invention. The active filter 100 includes a zig-zag-delta transformer 102 having a zig-zag set of windings 104 and a delta set of windings 106. The zig-zag set of windings of 104 includes a neutral 108 that receives the neutral current $i_n$ generated by the current generator 30 as described above. As illustrated, non-neutral harmonic currents generated by the current generator 62 are injected into the delta set of windings 106 which in turn are reflected in the zig-zag set of windings 104 and injected into the conductors 18A–18C since the set of delta windings 106 is magnetically coupled to the set of zig-zag windings 104.

The three non-neutral harmonic currents required to flow through the zig-zag transformer winding for reducing non-neutral harmonic current contribution in conductors 18A–18C from the distribution transformer 14 can be expressed as:

$$i_{z\Delta a} = i_{La} - i_n/3 \quad (3A)$$

$$i_{z\Delta b} = i_{Lb} - i_n/3 \quad (3B)$$

$$i_{z\Delta c} = i_{Lc} - i_n/3 \quad (3C)$$

Delta winding currents $i_{\Delta a}$, $i_{\Delta b}$ and $i_{\Delta c}$ necessary to develop the zig-zag transformer winding currents indicated above can be expressed as:

$$\begin{bmatrix} i_{\Delta a} \\ i_{\Delta b} \\ i_{\Delta c} \end{bmatrix} = \frac{N_z}{N_d} \begin{bmatrix} 0 & -1 & 1 \\ 1 & 0 & -1 \\ -1 & 1 & 0 \end{bmatrix} \begin{bmatrix} i_{z\Delta a} \\ i_{z\Delta b} \\ i_{z\Delta c} \end{bmatrix} \quad \text{EQ. 4}$$

where, $N_z$ equals the number of turns of each zig-zag winding; and $N_d$ equals the number of turns of each delta winding.

Applying Kirchhoff's current law at each node of the set of delta windings 106, the currents $i_{fa}$, $i_{fb}$ and $i_{fc}$, can be expressed as:

$$\begin{bmatrix} i_{fa} \\ i_{fb} \\ i_{fc} \end{bmatrix} = \begin{bmatrix} 0 & 1 & -1 \\ -1 & 0 & 1 \\ 1 & -1 & 0 \end{bmatrix} \begin{bmatrix} i_{\Delta a} \\ i_{\Delta b} \\ i_{\Delta c} \end{bmatrix} \quad \text{EQ. 5}$$

Combining equations 3A–3C, 4 and 5, the required currents from the current generator 62 can be directly calculated in terms of the measured load harmonic currents as:

$$\begin{bmatrix} i_{fa} \\ i_{fb} \\ i_{fc} \end{bmatrix} = \frac{N_z}{N_d} \begin{bmatrix} 2 & -1 & -1 \\ -1 & 2 & -1 \\ -1 & -1 & 2 \end{bmatrix} \begin{bmatrix} i_{La} - i_n/3 \\ i_{Lb} - i_n/3 \\ i_{Lc} - i_n/3 \end{bmatrix} \quad \text{EQ. 6}$$

The control scheme illustrated in FIG. 3 is well suited for operating the current generator 62 of FIG. 4 pursuant to Equation 6.

The active filter 100 is further discussed in "Hardware Implementation of a Novel Reduced Rating Active Filter for Three-Phase, Four-Wire Loads" by Kamath et al. published in IEEE/APEC March 1995, Conference Records pp. 984–989 which is incorporated in its entirety by reference.

Although the present invention has been described with reference to preferred embodiments, workers skilled in the art will recognize that changes may be made in form and detail without departing from the spirit and scope of the invention.

What is claimed is:

1. A system for providing harmonic currents to a harmonic generating load connected to a multiphase alternating current power system, the multiphase alternating current power system having a neutral return path, the filtering system comprising:

a zig-zag transformer electrically connectable to the multiphase alternating current power system; and a current generator electrically connected between the neutral return path of the multiphase alternating current power system and a neutral of the zig-zag transformer, the current generator providing a harmonic current into the neutral of the zig-zag transformer.

2. The system of claim 1 and further comprising a second current generator electrically connectable to the multiphase alternating current power system, wherein the first-mentioned current generator supplies harmonic current to the neutral of the zig-zag transformer as a function of harmonic current in the neutral return path, and wherein the second current generator supplies harmonic current to the multiphase current power system other than the harmonic current in the neutral return path.

3. The system of claim 2 wherein the zig-zag transformer includes a set of delta connected windings, and wherein the second current generator is connected to the set of delta connected windings.

4. The system of claim 3 wherein the first-mentioned current generator comprises an inverter and the second current generator comprises a multiphase inverter.

5. The system of claim 1 and further comprising an inductor electrically connected between the current generator and the neutral of the zig-zag transformer.

6. The system of claim 1 and further comprising means for measuring a voltage potential between the neutral of the zig-zag transformer and the neutral of the zig-zag transformer from the neutral return path when the voltage potential is greater than a selected value.

7. The system of claim 1 a fault protection device electrically connected across terminals of the current generator.

8. The system of claim 1 and further comprising:

a current sensor measuring the harmonic currents; and a controller receiving a signal from the current sensor indicative of the harmonic currents and operably connected to the current generator, the controller controlling operation of the current generator as a function of the signal from the current sensor.

9. A method of providing harmonic currents to a harmonic generating load connected to a multiphase alternating current power system, the multiphase alternating current power system having a neutral return path, the method comprising the steps of:

providing a zig-zag transformer electrically connected to the multiphase alternating current power system; and a current generator electrically connected between the neutral return path of the multiphase alternating current power system and a neutral of the zig-zag transformer; and injecting a harmonic current from the current generator into the neutral of the zig-zag transformer.

10. The method of claim 9 wherein the step of providing includes providing a second current generator connected to the multiphase current power system and the step of injecting includes injecting the first-mentioned harmonic current into the neutral of the zig-zag transformer as a function of harmonic current in the neutral return path, and injecting another harmonic current from the second current generator into the multiphase current power system.

11. The method of claim 10 wherein the zig-zag transformer includes a set of delta connected windings, and wherein the step of injecting includes injecting the another harmonic current into the set of delta connected windings.

12. The system of claim 11 wherein the first-mentioned current generator comprises an inverter and the second current generator comprises a multiphase inverter.

13. The method of claim 9 wherein the step of providing includes providing an inductor electrically connected to the neutral of the zig-zag transformer, and the step of injecting includes injecting the harmonic current into the inductor.

14. The method of claim 9 wherein the current generator comprises an inverter.

15. The method of claim 9 and further comprising measuring the harmonic currents, and wherein the step of injecting includes injecting the harmonic current into the neutral of the zig-zag transformer as a function of the measured harmonic currents.

* * * * *